United States Patent
Lan et al.

(10) Patent No.: US 10,306,736 B1
(45) Date of Patent: May 28, 2019

(54) ELECTRONIC DEVICE AND LIGHT ADJUSTING METHOD

(71) Applicant: HON HAI PRECISION INDUSTRY CO., LTD., New Taipei (TW)

(72) Inventors: Tzu-Hsiang Lan, New Taipei (TW); Te-En Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 12 days.

(21) Appl. No.: 15/859,754

(22) Filed: Jan. 2, 2018

(30) Foreign Application Priority Data

Nov. 29, 2017 (TW) .............................. 106141642 A

(51) Int. Cl.
*H05B 37/02* (2006.01)
*H04N 5/235* (2006.01)
*G08G 1/07* (2006.01)
*B60Q 1/14* (2006.01)

(52) U.S. Cl.
CPC ....... *H05B 37/0227* (2013.01); *H04N 5/2353* (2013.01); *H05B 37/0218* (2013.01); *B60Q 1/1423* (2013.01); *G08G 1/07* (2013.01)

(58) Field of Classification Search
CPC ............ H05B 37/0218; H05B 37/0227; H05B 37/0245

USPC ................................................... 315/153, 307
See application file for complete search history.

(56) References Cited

U.S. PATENT DOCUMENTS

| | | | |
|---|---|---|---|
| 9,591,718 B2 * | 3/2017 | So ...................... | H05B 37/0218 |
| 2015/0145419 A1 * | 5/2015 | Lashina ............. | H05B 33/0872 315/153 |
| 2015/0156845 A1 * | 6/2015 | Park ................... | H05B 33/0854 315/153 |
| 2017/0208237 A1 * | 7/2017 | Nagata ..................... | G03B 7/16 |
| 2018/0232947 A1 * | 8/2018 | Nehmadi ................ | G06T 17/05 |

FOREIGN PATENT DOCUMENTS

TW          201103364 A1     1/2011

* cited by examiner

*Primary Examiner* — Tung X Le
(74) *Attorney, Agent, or Firm* — ScienBiziP, P.C.

(57) ABSTRACT

A lighting adjusting method applied to a light-emitting electronic device includes a distance sensor includes obtaining distance data to objects or human beings being present or not present. Once a first lighting power level is determined for at least one lighting device according to the distance data and associated power level required, the at least one lighting device is controlled to adjust the level of lighting as circumstances change.

12 Claims, 7 Drawing Sheets

| Distance value "L" (Unit (m)) | Working parameter (Unit (A)) |
|---|---|
| L<0.3 | 0.02 |
| 0.3≤L≤0.5 | 0.05 |
| 0.5<L<1 | 0.12 |
| L=1 | 0.45 |
| L>1 | 0.5 |

FIG. 3

ELECTRONIC DEVICE AND LIGHT ADJUSTING METHOD

CROSS-REFERENCE TO RELATED APPLICATIONS

This application claims priority to Taiwanese Patent Application No. 106141642 filed on Nov. 29, 2017, the contents of which are incorporated by reference herein.

FIELD

The subject matter herein generally relates to managing technology, and particularly to an electronic device and a lighting adjusting method.

BACKGROUND

A lighting device of an electronic device such as a mobile phone is generally activated according to a preset current value. However, this method may not suit all devices.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 3 illustrate a list of different distance data corresponding to different working parameters.

DETAILED DESCRIPTION

Figure 1:
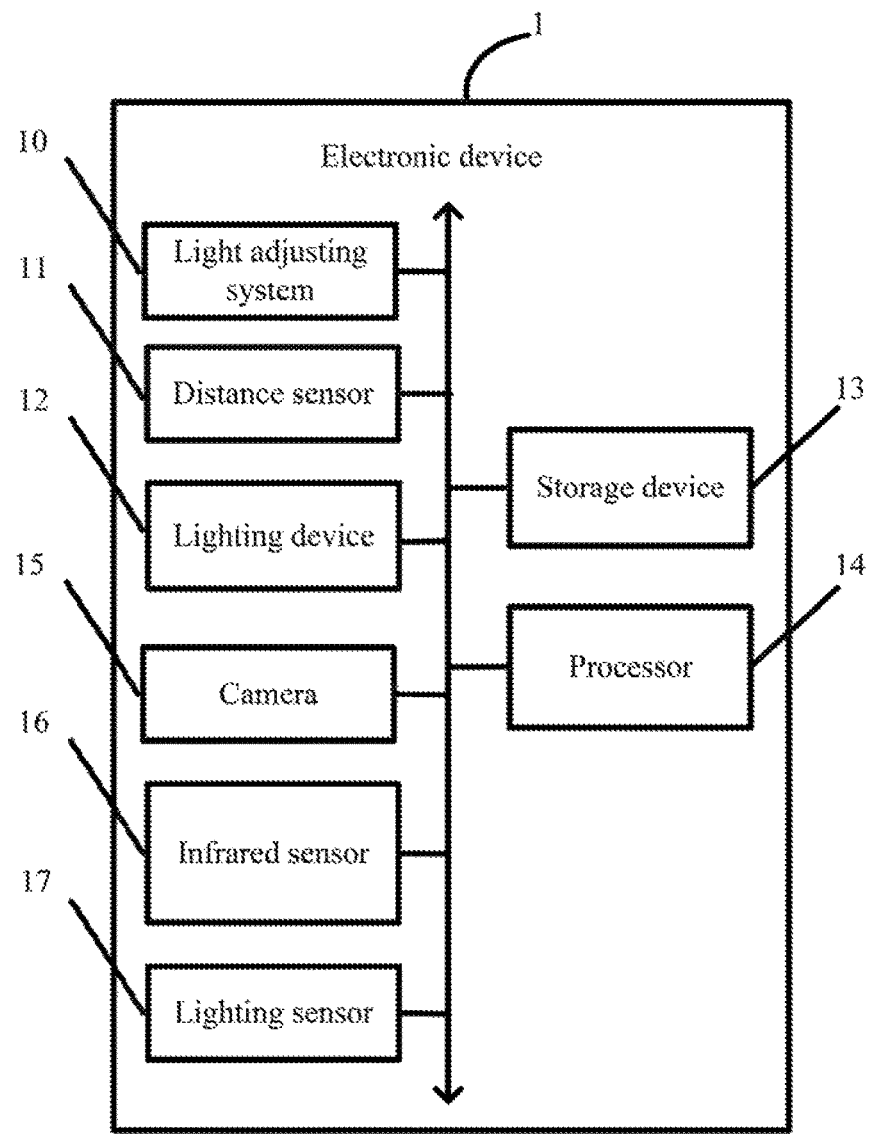
FIG. 1 illustrates a block diagram of an exemplary embodiment of an electronic device including a light adjusting system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 illustrates a block diagram of an exemplary embodiment of an electronic device including a light adjusting system. Depending on the exemplary embodiment, an electronic device 1 can include, but is not limited to, a light adjusting system 10, a distance sensor 11, one or more lighting devices 12, a storage device 13, and at least one processor 14. The light adjusting system 10 can adjust the lighting power of the one or more lighting devices 12 according to distance data detected by the distance sensor 11. For example, the light adjusting system 10 can adjust a magnitude of a current or a voltage of the lighting device 12.

In at least one exemplary embodiment, the electronic device 1 can be a table lamp, a flashlight, or a head lamp.

In at least one exemplary embodiment, the one or more lighting devices 12 can be internally configured in the electronic device 1 or externally connected with the electronic device 1. For example, the one or more lighting devices 12 can be low beams and high beams of a vehicle, and the electronic device 1 can be a car computer of the vehicle.

In at least one exemplary embodiment, the one or more lighting devices 12 can be lighting devices which can emit light in different colors. For example, the one or more lighting device 12 may be configured beside a zebra crossing, and can guide pedestrians to cross the zebra crossing by emitting green light or red light.

In at least one exemplary embodiment, the electronic device 1 can be a mobile phone or a camera device which is configured with a function of capturing images. The electronic device 1 can further include a camera 15, and at least one of the one or more lighting devices 12 can be a flash lamp.

In at least one exemplary embodiment, the electronic device 1 can further include an infrared sensor 16. The infrared sensor 16 can be used to detect presence of humans.

In at least one exemplary embodiment, the electronic device 1 can further include a lighting sensor 17. The lighting sensor 17 can be used to detect a light value of an environment around the electronic device 1. In at least one exemplary embodiment, the lighting sensor 17 can be a light dependent resistor, or an ambient light sensor.

In other exemplary embodiments, the electronic device 1 may not include the lighting sensor 17. The electronic device 1 may detect the light value of the environment around the electronic device 1 using the camera 15.

The storage device 13 can be used to store all kinds of data of the electronic device 1. For example, the storage device 13 can store program codes of the light adjusting system 10. In at least one exemplary embodiment, the storage device 13 can be an internal storage device such as a memory of the electronic device 1. In other exemplary embodiments, the storage device 13 can be an external storage device such as a secure digital card or a cloud storage device of the electronic device 1.

In at least one exemplary embodiment, the light adjusting system 10 stores a list in the storage device 13. As shown in FIG. 3, the list includes different working parameters of the lighting device 12 corresponding to different distance data detected by the distance sensor 11. It should be noted that the working parameters in the present embodiment illustrated in FIG. 3 are values of electrical current in units of ampere (A). In other exemplary embodiments, the working parameters can be voltage values or other kinds of parameters such as brightness values or colors.

Figure 2:
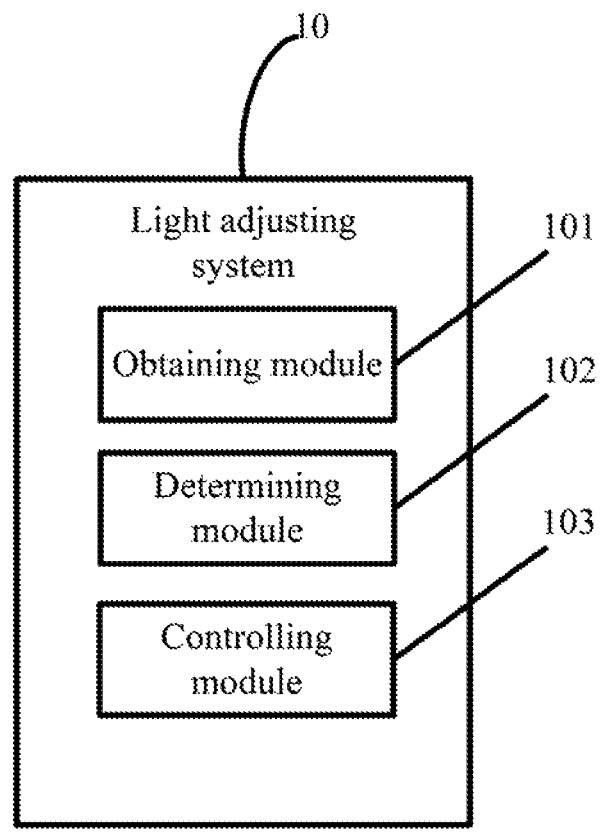
FIG. 2 illustrates a block diagram of an exemplary embodiment of modules of the light adjusting system of FIG. 1.

FIG. 2 is a block diagram of an exemplary embodiment of modules of the light adjusting system 10. In at least one exemplary embodiment, the light adjusting system 10 can include an obtaining module 101, a determining module 102, and a controlling module 103. The modules 101-103 include computer instructions or codes in the form of one or more programs that may be executed by the at least one processor 14.

Figure 4:
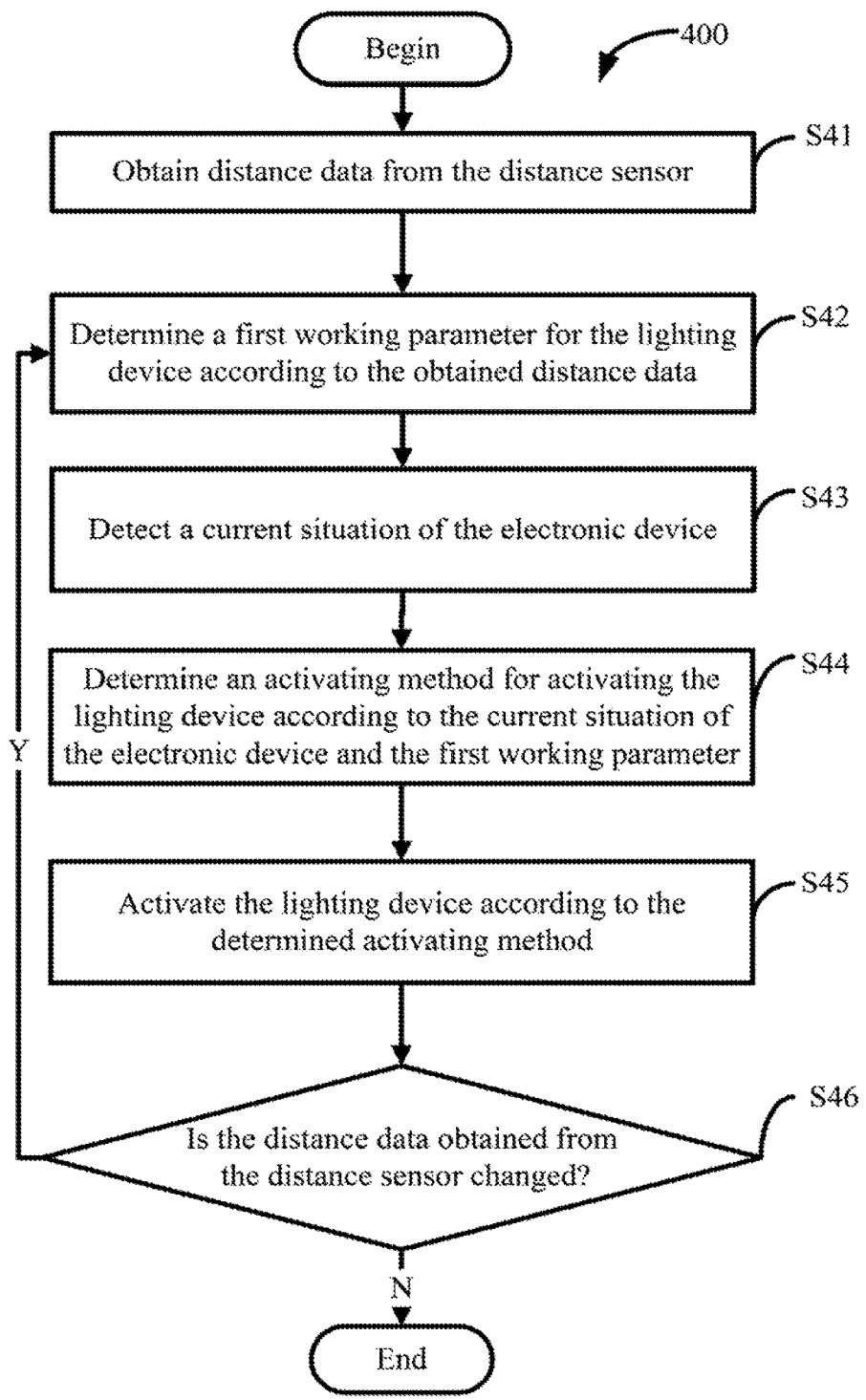
FIG. 4 illustrates a first flow chart of one exemplary embodiment of a method of adjusting lighting power.

FIG. 4 illustrates an exemplary embodiment of a first flowchart of one exemplary embodiment of a method of adjusting lighting. The exemplary embodiment is provided based on the electronic device 1 including one lighting device 12. The example method 400 is provided by way of example, as there are a variety of ways to carry out the method. The method 400 described below can be carried out using the configurations illustrated in FIG. 1, for example, and various elements of these figures are referenced in explaining example method 400. Each block shown in FIG. 4 represents one or more processes, methods, or subroutines, carried out in the example method 400. Additionally, the illustrated order of blocks is by example only and the order of the blocks can be changed. The example method 400 can begin at block 41. Depending on the exemplary embodiment, additional steps can be added, others removed, and the ordering of the steps can be changed.

At block S41, the obtaining module 101 can obtain distance data from the distance sensor 11.

In at least one exemplary embodiment, the obtaining module 101 can activate the distance sensor 11 in response to user input. For example, the obtaining module 101 can provide a user interface, and activate the distance sensor 11 when a predetermined input is received from the user interface. The predetermined input can be a predetermined button on the user interface being double clicked or a predetermined gesture being generated on the user interface.

At block S42, the determining module 102 can determine a first working parameter "X" for the lighting device 12 according to the obtained distance data.

In at least one exemplary embodiment, the determining module 102 can determine the first working parameter "X" by searching the list according to the obtained distance data. For example, when the obtained distance data is 0.3 meter, the determining module 102 can determine that the first working parameter "X" for the lighting device 12 equals 0.05 ampere.

At block S43, the obtaining module 101 can detect a current situation of the electronic device 1.

In at least one exemplary embodiment, the current situation of the electronic device 1 includes whether human is present around the electronic device 1. The obtaining module 101 can determine whether a human is present around the electronic device 1 using the infrared sensor 16.

In other exemplary embodiments, the current situation of the electronic device 1 can further include a brightness value of the environment around the electronic device 1. The obtaining module 101 can obtain the brightness value of the environment around the electronic device 1 using the lighting sensor 17.

In other exemplary embodiments, when the electronic device 1 includes the camera 15, the obtaining module 101 can obtain the brightness value of the environment around the electronic device 1 using the camera.

At block S44, the determining module 102 can determine an activating method for activating the lighting device 12 according to the current situation of the electronic device 1 and the first working parameter "X".

In at least one exemplary embodiment, when no human is present around the electronic device 1, the determining module 102 can determine a first activating method for the lighting device 12. When there is a human presence around the electronic device 1, the determining module 102 can determine a second activating method for the lighting device 12.

In at least one exemplary embodiment, the first activating method is defined as the electronic device 1 directly activating the lighting device 12 based on the first working parameter "X".

The second activating method is defined as the electronic device 1 first activates the lighting device 12 based on a second working parameter "Y". When the lighting device 12 is activated, the electronic device 1 then directly or gradually increases the value of the working parameter of the lighting device 12 from the second working parameter "Y" to the first working parameter "X", such that a user does not feel uncomfortable because the lighting device 12 is not directly activated based on the first working parameter "X". It should be noted that when the lighting device 12 is directly activated based on the first working parameter "X", the user may feel uncomfortable because the lighting device 12 is activated under a bright light in a sudden.

In at least one exemplary embodiment, when the electronic device 1 increases the working parameter of the lighting device 12 from the second working parameter "Y" to the first working parameter "X", the electronic device 1 can increase a preset value "Z" each time until the working parameter of the lighting device 12 equals to the first working parameter "X". In at least one exemplary embodiment, the preset value "Z" is calculated using a predetermined formula: $Z=(X-Y)/N$. N can be predetermined by the user. For example, N may equal 1, 2, 3, 4, or 5.

In at least one exemplary embodiment, the second working parameter "Y" is less than the first working parameter "X". In at least one exemplary embodiment, the second working parameter "Y" equals a half of the first working parameter "X".

At block S45, the controlling module 103 can activate the lighting device 12 according to the determined activating method.

For example, the controlling module 103 can directly activate the lighting device 12 based on 0.05 amperes when the first activating method is determined at block S44.

At block S46, the determining module 102 can determine whether the distance data obtained from the distance sensor 11 is changed. When the distance data obtained from the distance sensor 11 is changed, the process goes to block S42. At block S42, the determining module 102 determines a new working parameter for the lighting device 12 according to the distance data currently obtained from the distance sensor

11. When the distance data obtained from the distance sensor 11 is not changed, the process ends.

In at least one exemplary embodiment, when the distance data currently obtained from the distance sensor 11 does not equal the distance data previously obtained from the distance sensor 11 (e.g., the distance data obtained from the distance sensor 11 at block S41), the determining module 102 can determine that the distance data obtained from the distance sensor 11 is changed. When the distance data currently obtained from the distance sensor 11 equals to the distance data previously obtained from the distance sensor 11, the determining module 102 can determine that the distance data obtained from the distance sensor 11 is not changed.

In other exemplary embodiments, when a difference between the distance data currently obtained from the distance sensor 11 and the distance data previously obtained from the distance sensor 11 is greater than a preset value (e.g., 0.2 m), the determining module 102 can determine that the distance data obtained from the distance sensor 11 is changed. When the difference is less than the preset value, the determining module 102 can determine that the distance data obtained from the distance sensor 11 is not changed.

In other exemplary embodiments, blocks S43-S44 can be omitted. At block S45, the controlling module 103 can directly activate the lighting device 12 according to the first working parameter determined at block S42.

In other exemplary embodiments, when the electronic device 1 includes more than one lighting devices 12, the determining module 102, at block S42, can determine which lighting devices of the more than one lighting devices 12 should be activated at block S45. At block S45, the controlling module 103 can activate the lighting devices determined at block S42.

For example, when the more than one lighting devices 12 includes high beams and low beams of a vehicle, the determining module 102 can determine whether the high beams, the low beams, or a combination thereof should be activated at block S45. For example, when the obtained distance data is less than a preset value (e.g., 50 meters, 100 meters), the determining module 102 can determine that the low beams should be activated at block S45. When the obtained data is greater than or equal to the preset value, the determining module 102 can determine that the high beams should be activated, at block S45.

Figure 5:
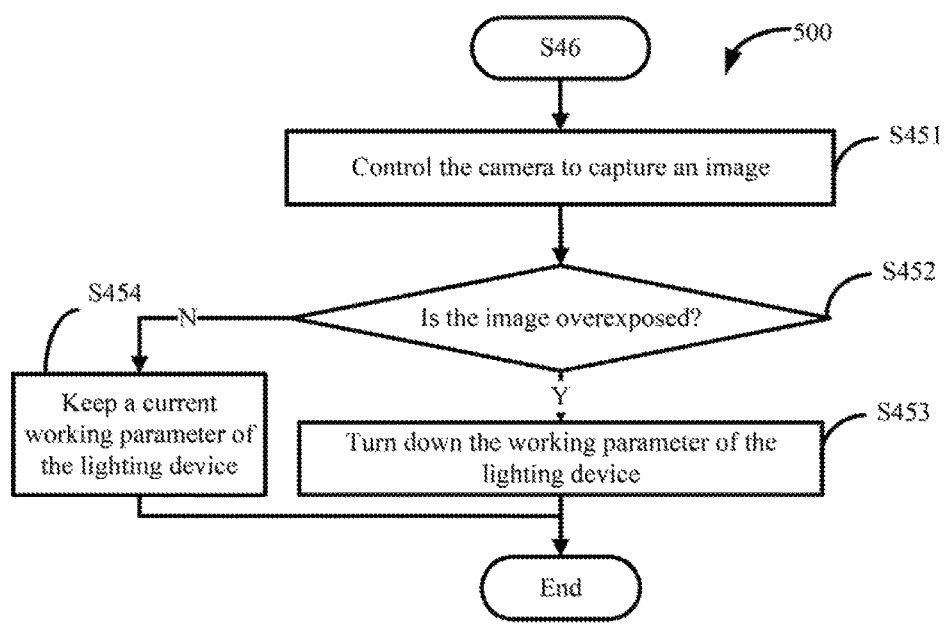
FIG. 5 illustrates a second flow chart of the exemplary embodiment of the method of adjusting lighting power.

FIG. 5 illustrates a second flowchart of one exemplary embodiment of a method of adjusting lighting. The exemplary embodiment is provided based on the electronic device 1 further including a camera 15. The example method 500 is provided by way of example, as there are a variety of ways to carry out the method. The method 500 described below can be carried out using the configurations illustrated in FIG. 1, for example, and various elements of these figures are referenced in explaining example method 500. Each block shown in FIG. 5 represents one or more processes, methods, or subroutines, carried out in the example method 500. Additionally, the illustrated order of blocks is by example only and the order of the blocks can be changed. The example method 500 can follow block S46. Depending on the exemplary embodiment, additional steps can be added, others removed, and the ordering of the steps can be changed.

At block S451, the controlling module 103 can control the camera 15 to capture an image.

At block S452, the determining module 102 can determine whether the image is overexposed. When the image is overexposed, the process goes to block S453. When the image is not overexposed, the process goes to block S454.

In at least one exemplary embodiment, when the determining module 102 determines whether the image is overexposed, the determining module 102 can obtain a brightness value of each pixel of the image. When the brightness value of each pixel of a certain area of the image is greater than a preset value (e.g., 200), the determining module 102 can determine that the image is overexposed.

At block S453, the controlling module 103 can turn down the working parameter of the lighting device 12.

For example, the controlling module 103 can turn down the working parameter of the lighting device 12 from 0.05 ampere to 0.04 ampere.

At block S454, the controlling module 103 can keep a current working parameter of the lighting device 12. In other words, the controlling module 103 does not adjust the working parameter of the lighting device 12.

In at least one exemplary embodiment, as shown in FIG. 5, when the block S453 is executed, the process is ended. In other exemplary embodiment, when the block S453 is executed, the process goes to block S451. In other words, the controlling module 103 can again control the camera 15 to capture another image, and the determining module 102 can then determine whether the another image is overexposed, the process is end until the image captured by the camera is not overexposed.

Figure 6:
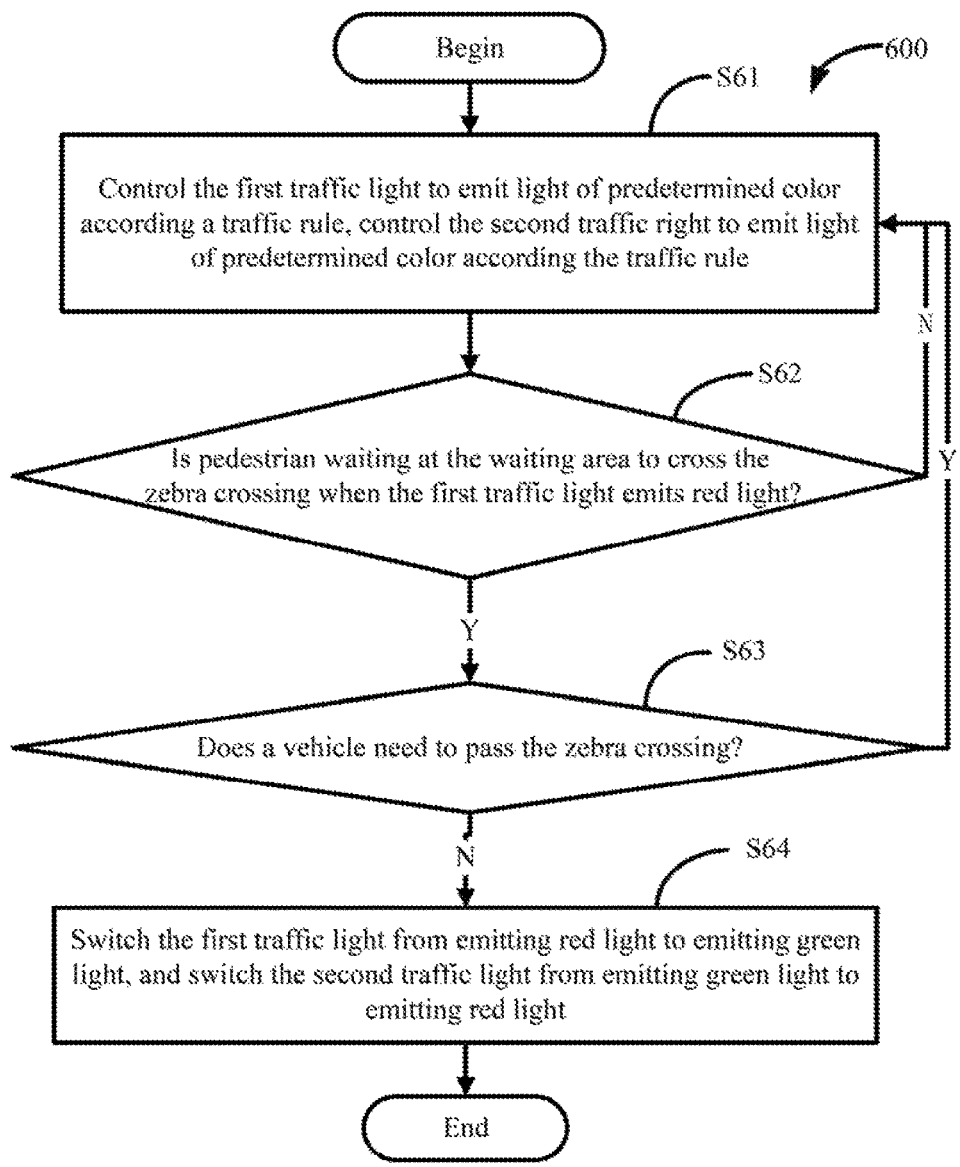
FIG. 6 illustrates a third flow chart of one exemplary embodiment of a method of adjusting lighting power.

FIG. 6 illustrates a third flowchart of one exemplary embodiment of a method of adjusting lighting. The exemplary embodiment is provided based on the electronic device 1 further including more than one lighting devices 12, the more than one lighting devices 12 being traffic lights. The example method 600 is provided by way of example, as there are a variety of ways to carry out the method. The method 600 described below can be carried out using the configurations illustrated in FIG. 1, for example, and various elements of these figures are referenced in explaining example method 600. Each block shown in FIG. 6 represents one or more processes, methods, or subroutines, carried out in the example method 600. Additionally, the illustrated order of blocks is by example only and the order of the blocks can be changed. The example method 600 can follow block S61. Depending on the exemplary embodiment, additional steps can be added, others removed, and the ordering of the steps can be changed.

Figure 7:
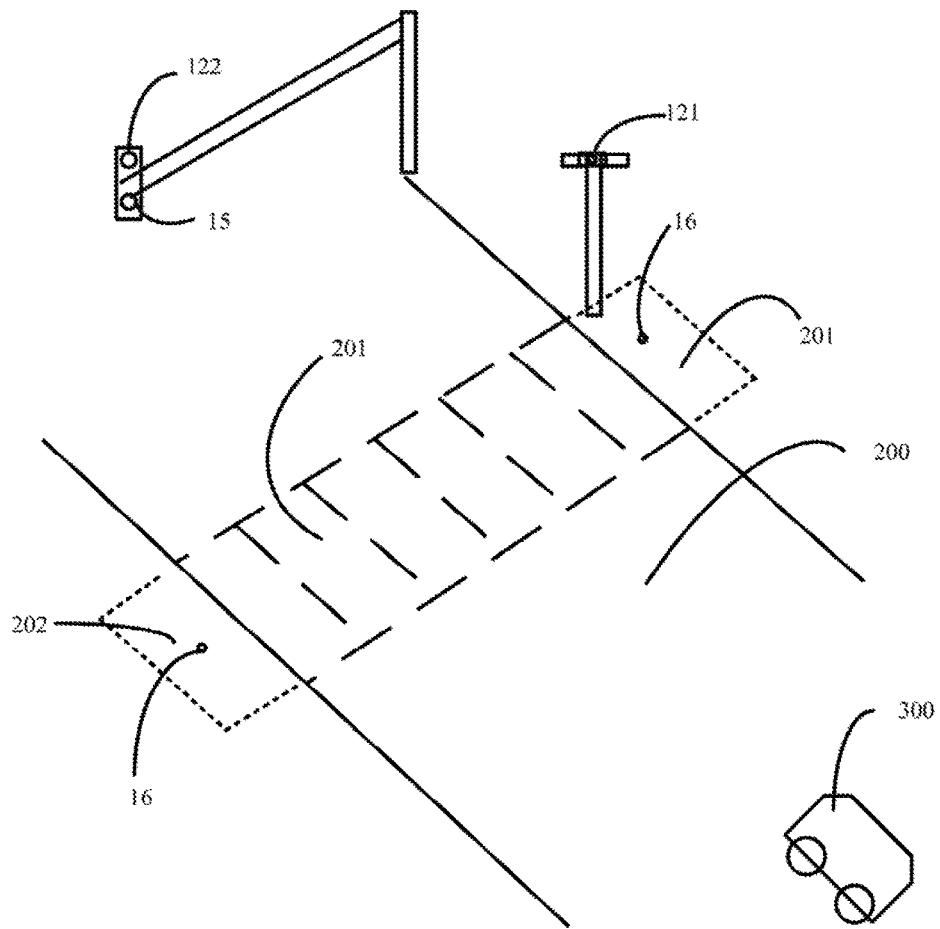
FIG. 7 illustrates an exemplary embodiment of an electronic device including more than one lighting device that is applied to a road.

Referring to FIG. 7, the more than one lighting devices 12 include a first traffic light 121 and a second traffic light 122. The first traffic light 121 can guide pedestrians to cross the zebra crossing 201 of a road 200 by emitting red light or green light. The second traffic light 122 can guide vehicle 300 to pass the zebra crossing 201 by emitting red light or green light. The infrared sensor 16 can detect whether there is pedestrian at a waiting area 202 waiting to cross the zebra crossing 201. The infrared sensor 16 can be configured at a position near the first traffic light 121, or at any position that is convenient. For example, the infrared sensor 16 can be configured below (underground) the waiting area 202. The camera 15 can capture images, and the images can be used to determine whether there is vehicle needing to cross the zebra crossing 201. The camera 15 can be configured at a position near the second traffic light 122, or any other position that is convenient to capture images of vehicles on the road 200.

At block S61, the determining module 102 can control the first traffic light 121 to emit light of predetermined color according a traffic rule. The determining module 102 can control the second traffic right 122 to emit light of predetermined color according the traffic rule.

The traffic rule can be a rule determined by a traffic managing department that defines when and how long the first traffic light 121 emits red right, when and how long the first traffic light 121 emits green right, when and how long the second traffic light 122 emits red right, and when and how long the second traffic light 122 emits green right. For example, the traffic rule defines that when the first traffic light 121 emits green light, and the second traffic light 122 must emit red light, the pedestrian can cross the zebra crossing 201 and the vehicle 300 should wait to pass the zebra crossing 201. When the first traffic light 121 emits red light and the second traffic light 122 emits green light, the pedestrian should wait at the waiting area 202 and cannot cross the zebra crossing 201, but the vehicle 300 can pass the zebra crossing 201.

At block S62, the determining module 102 can determine whether there is pedestrian waiting at the waiting area 202 to cross the zebra crossing 201 when the first traffic light 121 emits red light.

When there is pedestrian waiting at the waiting area 202 to cross the zebra crossing 201, the process goes to block S63. When there is no pedestrian waiting at the waiting area 202 to cross the zebra crossing 201, the process goes to block S61, i.e., the determining module 102 still control the first traffic light 121 and the second traffic light 122 to emit light according to the traffic rule.

In at least one exemplary embodiment, the determining module 102 can use the infrared sensor 16 to determine whether there is pedestrian waiting at the waiting area 202 to cross the zebra crossing 201. In other exemplary embodiments, the infrared sensor 16 can be replaced by a gravity sensor. For example, the determining module 102 can determine there is pedestrian waiting at the waiting area 202 to cross the zebra crossing 201 when the gravity sensor detects a gravity value greater than a preset value.

At block S63, the determining module 102 can determine whether there is a vehicle 300 needing to pass the zebra crossing 201. When there is the vehicle 300 needing to pass the zebra crossing 201, the process goes to block S61, i.e., the determining module 102 still control the first traffic light 121 and the second traffic light 122 to emit light according to the traffic rule. When no vehicle 300 needs to pass the zebra crossing 201, the process goes to block S64.

In at least one exemplary embodiment, the determining module 102 can control the camera 15 to capture one or more images, and determine whether there is vehicle 300 included in the images, using image recognition algorithm. When the image does not include a vehicle 300, the determining module 102 can determine that no vehicle 300 is needing to pass the zebra crossing 201.

At block S64, the controlling module 103 can switch the first traffic light 121 from emitting red light to emitting green light, and can switch the second traffic light 122 from emitting green light to emitting red light.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device comprising:
   a distance sensor;
   at least one lighting device;
   at least one processor;
   a storage device storing computerized instructions, which when executed by the processor, cause the at least one processor to:
      obtain distance data from the distance sensor;
      determine a first working parameter for the at least one lighting device according to the distance data;
      control the at least one lighting device according to the first working parameter; and
      adjust working parameter of the at least one lighting device according to a result of determining whether an image captured by the electronic device is overexposed;
   wherein the adjusting of the working parameter of the at least one lighting device comprises:
   controlling a camera of the electronic device to capture an image;
   determining whether the image is overexposed;
   lowering a value of the working parameter of the at least one lighting device when the image is overexposed; and
   keeping a current value of the working parameter of the at least one lighting device when the image is not overexposed.

2. The electronic device according to claim 1, wherein the at least one processor is further caused to:
   detect a current situation of the electronic device, wherein the current situation of the electronic device comprises whether a human is detected around the electronic device;
   determine an activating method for activating the at least one lighting device according to the current situation of the electronic device and the first working parameter; and
   activate the at least one lighting device according to the determined activating method.

3. The electronic device according to claim 2, wherein the at least one processor is further caused to:
   determine a first activating method for the at least one lighting device when no human is detected around the electronic device;
   determine a second activating method for the at least one lighting device when human is detected around the electronic device;
   wherein the first activating method is defined as the electronic device directly activating the at least one lighting device based on the first working parameter;
   wherein the second activating method is defined as the electronic device first activating the at least one lighting device based on a second working parameter, when the at least one lighting device is activated, the electronic device increases the working parameter of the at least one lighting device from the second working parameter to the first working parameter, the second working parameter is less than the first working parameter.

4. The electronic device according to claim 1, wherein when the at least one lighting device includes more than one lighting devices, the at least one processor is further caused to:
   determine, according to the distance data, which lighting devices of the more than one lighting devices are to be activated.

5. A light adjusting method applied to an electronic device comprising a distance sensor, the method comprising:
   obtaining distance data from the distance sensor;
   determining a first working parameter for the at least one lighting device according to the distance data;
   controlling the at least one lighting device according to the first working parameter; and
   adjusting working parameter of the at least one lighting device according to a result of determining whether an image captured by the electronic device is overexposed;
   wherein the adjusting of the working parameter of the at least one lighting device comprises:
   controlling a camera of the electronic device to capture an image;
   determining whether the image is overexposed;
   lowering a value of the working parameter of the at least one lighting device when the image is overexposed; and
   keeping a current value of the working parameter of the at least one lighting device when the image is not overexposed.

6. The method according to claim 5, further comprising:
   detecting a current situation of the electronic device, wherein the current situation of the electronic device comprises whether a human is detected around the electronic device; determine an activating method for activating the at least one lighting device according to the current situation of the electronic device and the first working parameter; and
   activating the at least one lighting device according to the determined activating method.

7. The method according to claim 6, further comprising:
   determining a first activating method for the at least one lighting device when no human is detected around the electronic device;
   determining a second activating method for the at least one lighting device when human is detected around the electronic device;
   wherein the first activating method is defined as the electronic device directly activates the at least one lighting device based on the first working parameter;
   wherein the second activating method is defined as the electronic device first activates the at least one lighting device based on a second working parameter, when the at least one lighting device is activated, the electronic device increases the working parameter of the at least one lighting device from the second working parameter to the first working parameter, the second working parameter is less than the first working parameter.

8. The method according to claim 5, wherein when the at least one lighting device includes more than one lighting devices, the method further comprises:
   determining, according to the distance data, which lighting devices of the more than one lighting devices are to activated.

9. A non-transitory storage medium having stored thereon instructions that, when executed by a processor of an electronic device which comprises a distance sensor, causes the processor to perform a light adjusting method, wherein the method comprises:
   obtaining distance data from the distance sensor;
   determining a first working parameter for the at least one lighting device according to the distance data;
   controlling the at least one lighting device according to the first working parameter; and
   adjusting working parameter of the at least one lighting device according to a result of determining whether an image captured by the electronic device is overexposed;
   wherein the adjusting of the working parameter of the at least one lighting device comprises:
   controlling a camera of the electronic device to capture an image;
   determining whether the image is overexposed;
   lowering a value of the working parameter of the at least one lighting device when the image is overexposed; and
   keeping a current value of the working parameter of the at least one lighting device when the image is not overexposed.

10. The non-transitory storage medium according to claim 9, wherein the method further comprises:
    detecting a current situation of the electronic device, wherein the current situation of the electronic device comprises whether a human presents is detected the electronic device; determine an activating method for activating the at least one lighting device according to the current situation of the electronic device and the first working parameter; and
    activating the at least one lighting device according to the determined activating method.

11. The non-transitory storage medium according to claim 10, wherein the method further comprises:
    determining a first activating method for the at least one lighting device when no human is detected around the electronic device;
    determining a second activating method for the at least one lighting device when human is detected around the electronic device;
    wherein the first activating method is defined as the electronic device directly activating the at least one lighting device based on the first working parameter;
    wherein the second activating method is defined as the electronic device first activating the at least one lighting device based on a second working parameter, when the at least one lighting device is activated, the electronic device increases the working parameter of the at least one lighting device from the second working parameter to the first working parameter, the second working parameter is less than the first working parameter.

12. The non-transitory storage medium according to claim 9, wherein when the at least one lighting device includes more than one lighting devices, wherein the method further comprises:
    determining, according to the distance data, which lighting devices of the more than one lighting devices are to be activated.

* * * * *